United States Patent
Murphy

(10) Patent No.: US 12,548,471 B1
(45) Date of Patent: Feb. 10, 2026

(54) EMBALMING TRAINING SYSTEM

(71) Applicant: Sharonda Murphy, Cuthbert, GA (US)

(72) Inventor: Sharonda Murphy, Cuthbert, GA (US)

( * ) Notice: Subject to any disclaimer, the term of this patent is extended or adjusted under 35 U.S.C. 154(b) by 520 days.

(21) Appl. No.: 18/109,372

(22) Filed: Feb. 14, 2023

(51) Int. Cl.
*G09B 23/30* (2006.01)
*A01N 1/00* (2006.01)

(52) U.S. Cl.
CPC .............. *G09B 23/303* (2013.01); *A01N 1/00* (2013.01)

(58) Field of Classification Search
CPC ....... G09B 23/303; G09B 23/285; A01N 1/00
USPC .................................................. 27/22.1, 22.2
See application file for complete search history.

(56) References Cited

U.S. PATENT DOCUMENTS

| | | | | |
|---|---|---|---|---|
| 2,752,697 A * | 7/1956 | Lawall | ................. | G09B 23/288 434/268 |
| 3,027,655 A * | 4/1962 | Alderson | ............... | G09B 23/32 434/268 |
| 4,331,426 A * | 5/1982 | Sweeney | .............. | G09B 23/288 434/265 |
| 4,439,162 A * | 3/1984 | Blaine | .................... | G09B 23/34 434/273 |
| 5,314,339 A | 5/1994 | Aponte | | |
| 5,340,350 A * | 8/1994 | Fink | ......................... | A63H 3/06 40/538 |
| 7,845,949 B2 | 12/2010 | Wilkins | | |
| 7,887,330 B2 | 2/2011 | King | | |
| 8,632,343 B2 | 1/2014 | Blackburn | | |
| D754,794 S | 4/2016 | Rademacher | | |
| 9,997,087 B2 | 6/2018 | Segall | | |
| 11,410,576 B2 * | 8/2022 | Fernandez | ........... | G09B 23/303 |
| 12,451,029 B2 * | 10/2025 | Kang | ................... | B60N 2/0022 |
| 2008/0293029 A1 * | 11/2008 | Wilkins | ............... | G09B 23/286 434/272 |
| 2015/0325148 A1 | 11/2015 | Won | | |
| 2016/0140878 A1 * | 5/2016 | Fernandez | .......... | G09B 23/303 434/268 |
| 2018/0322808 A1 | 11/2018 | Gi | | |

* cited by examiner

Primary Examiner — William L Miller
(74) Attorney, Agent, or Firm — Kyle A. Fletcher, Esq.

(57) ABSTRACT

The embalming training system is a training device. The embalming training system is adapted for use in mortuary services. The embalming training system trains an individual in the embalming process. The embalming training system includes a puppet structure and a fluid transport structure. The puppet structure is a puppet that simulates a body that is undergoing the embalming process. The fluid transport structure is a fluid network that simulates the arteries and veins of the body that is undergoing the embalming process.

11 Claims, 6 Drawing Sheets

EMBALMING TRAINING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of preservation of bodies of humans or animals and associated training. (A01N1/00)

Summary of Invention

The embalming training system is a training device. The embalming training system is adapted for use in mortuary services. The embalming training system trains an individual in the embalming process. The embalming training system comprises a puppet structure and a fluid transport structure. The puppet structure is a puppet that simulates a body that is undergoing the embalming process. The fluid transport structure is a fluid network that simulates the arteries and veins of the body that is undergoing the embalming process.

These together with additional objects, features and advantages of the embalming training system will be readily apparent to those of ordinary skill in the art upon reading the following detailed description of the presently preferred, but nonetheless illustrative, embodiments when taken in conjunction with the accompanying drawings.

In this respect, before explaining the current embodiments of the embalming training system in detail, it is to be understood that the embalming training system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the embalming training system.

It is therefore important that the claims be regarded as including such equivalent construction insofar as they do not depart from the spirit and scope of the embalming training system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
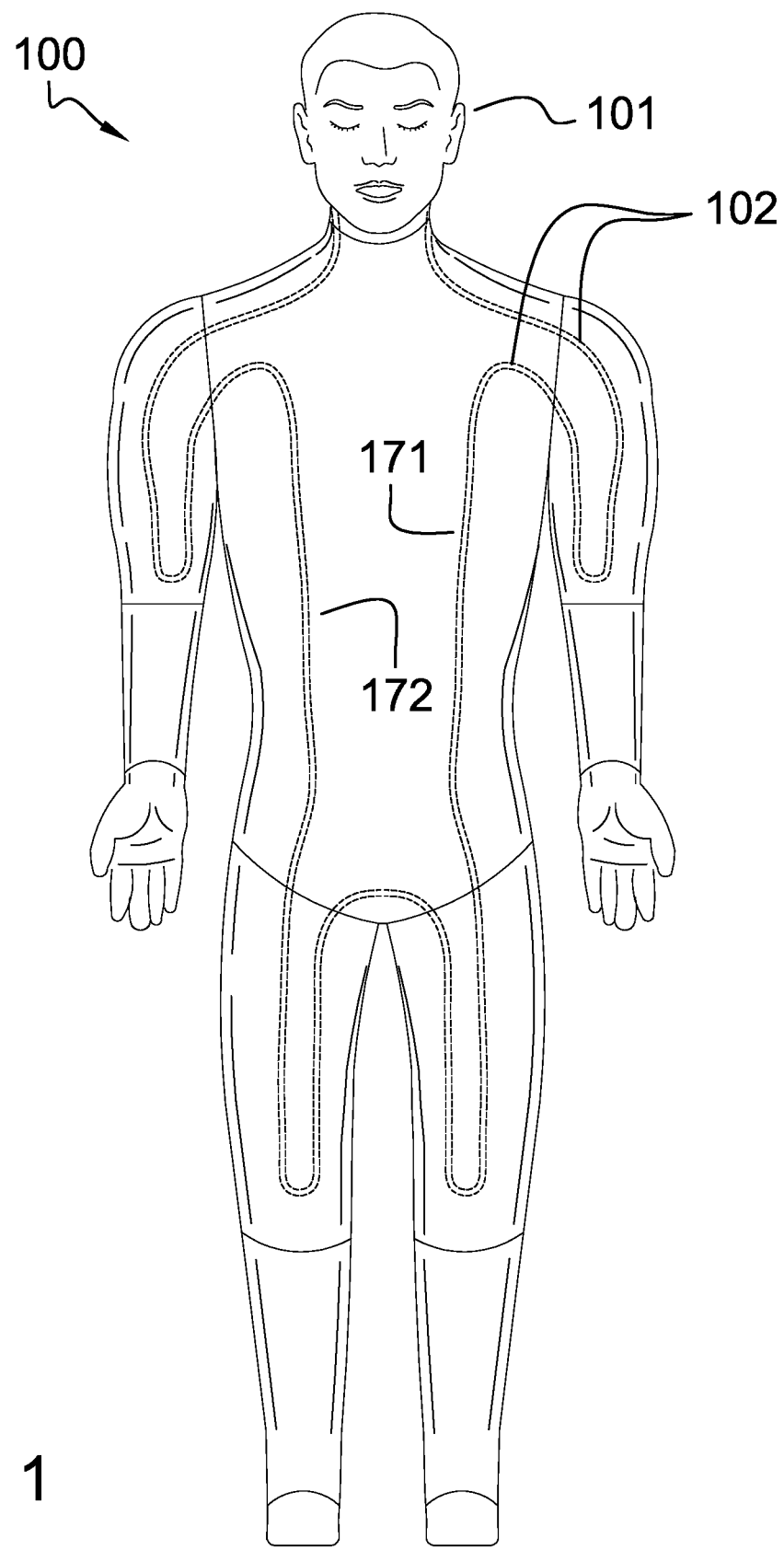
FIG. 1 is an anterior view of an embodiment of the disclosure.
Figure 2:
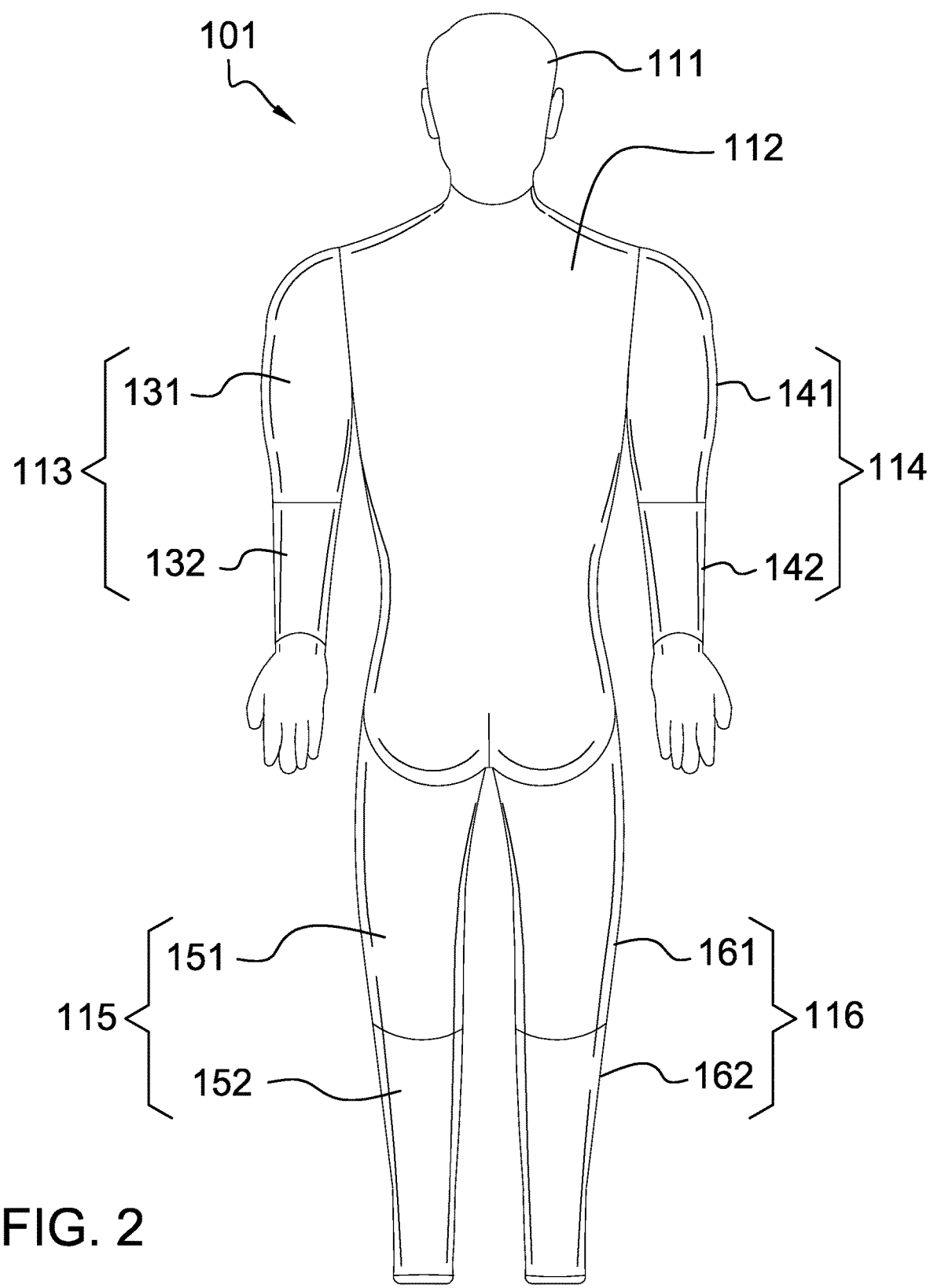
FIG. 2 is a posterior view of an embodiment of the disclosure.
Figure 3:
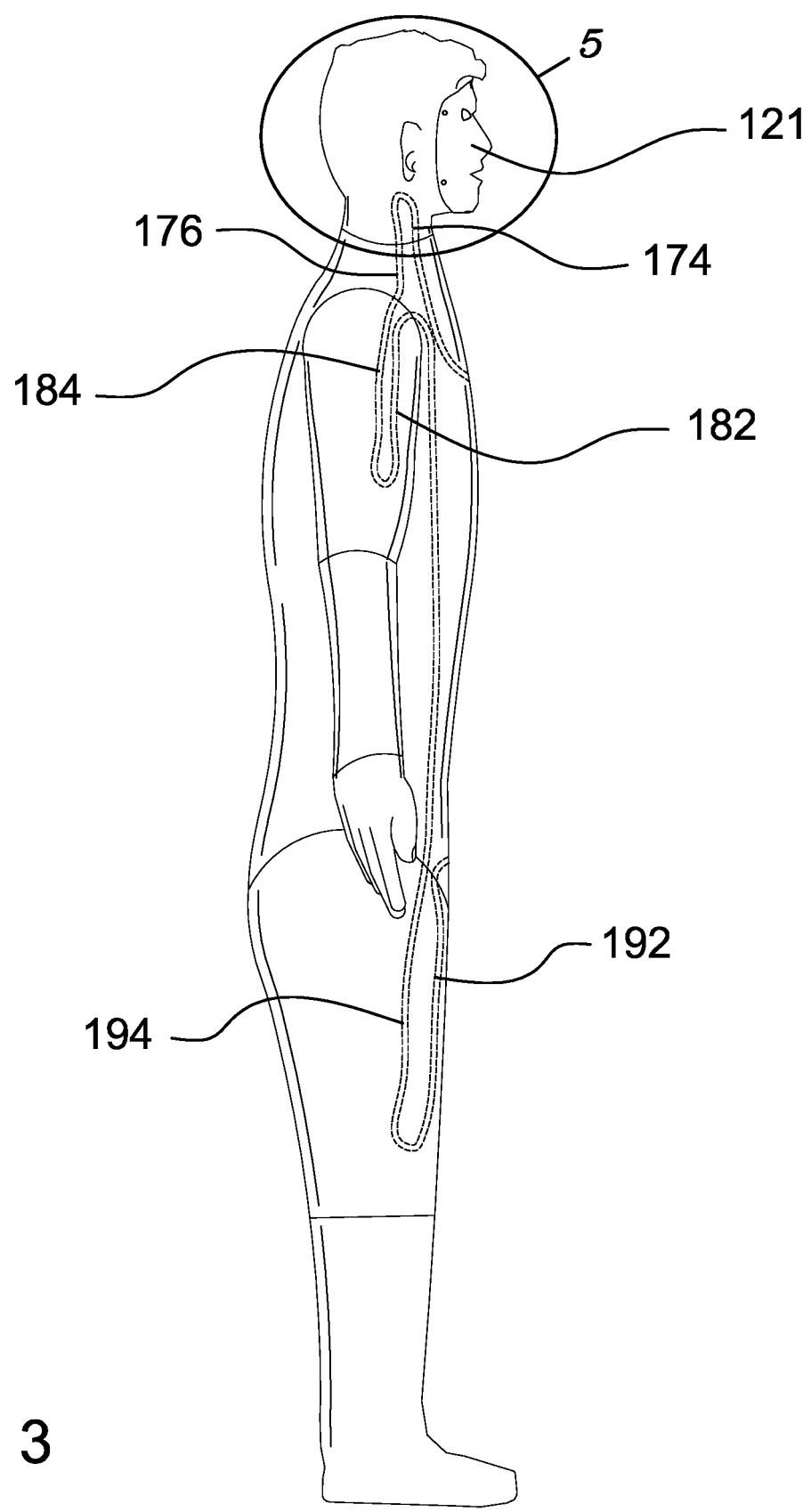
FIG. 3 is a lateral view of an embodiment of the disclosure.
Figure 4:
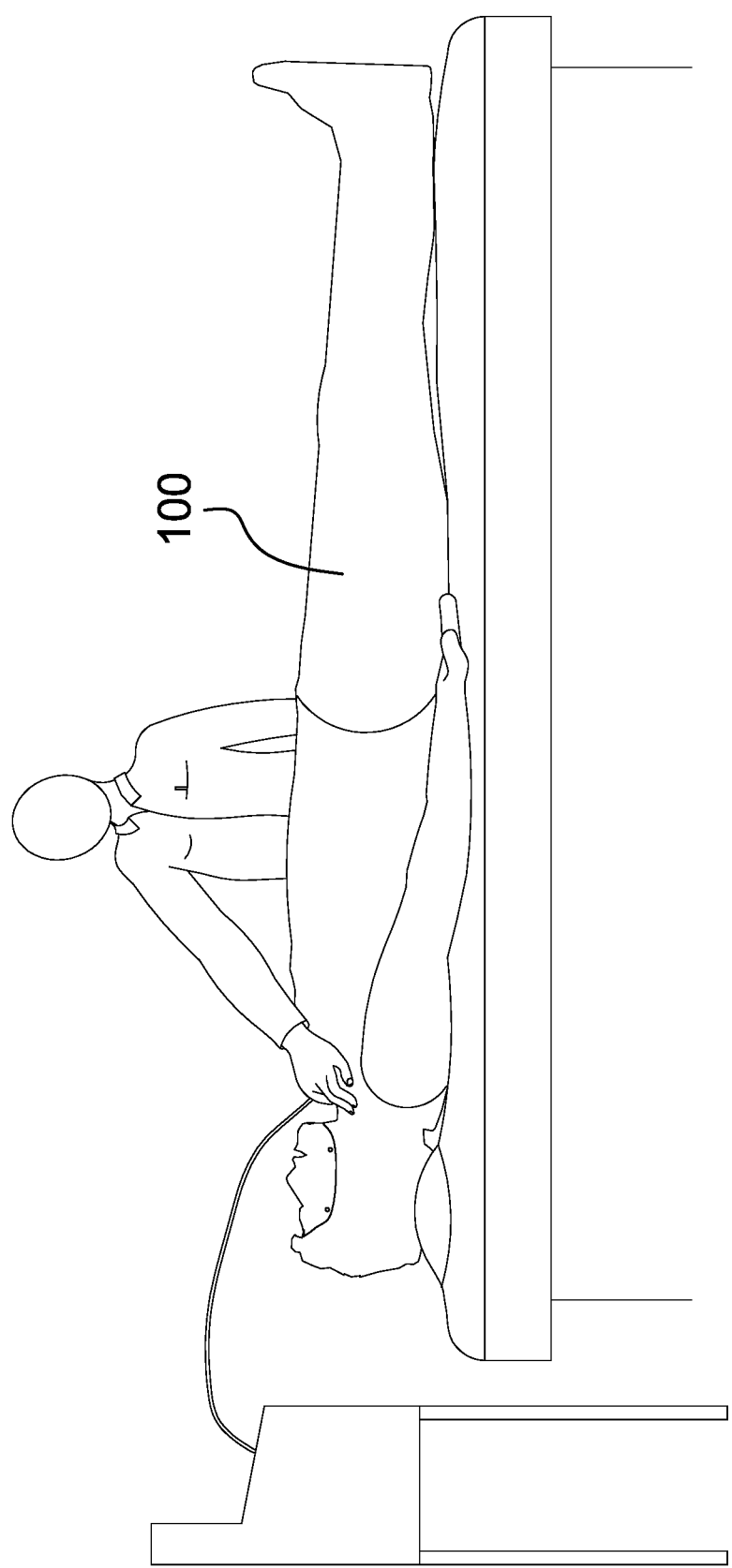
FIG. 4 is a lateral view of an embodiment of the disclosure.
Figure 5:
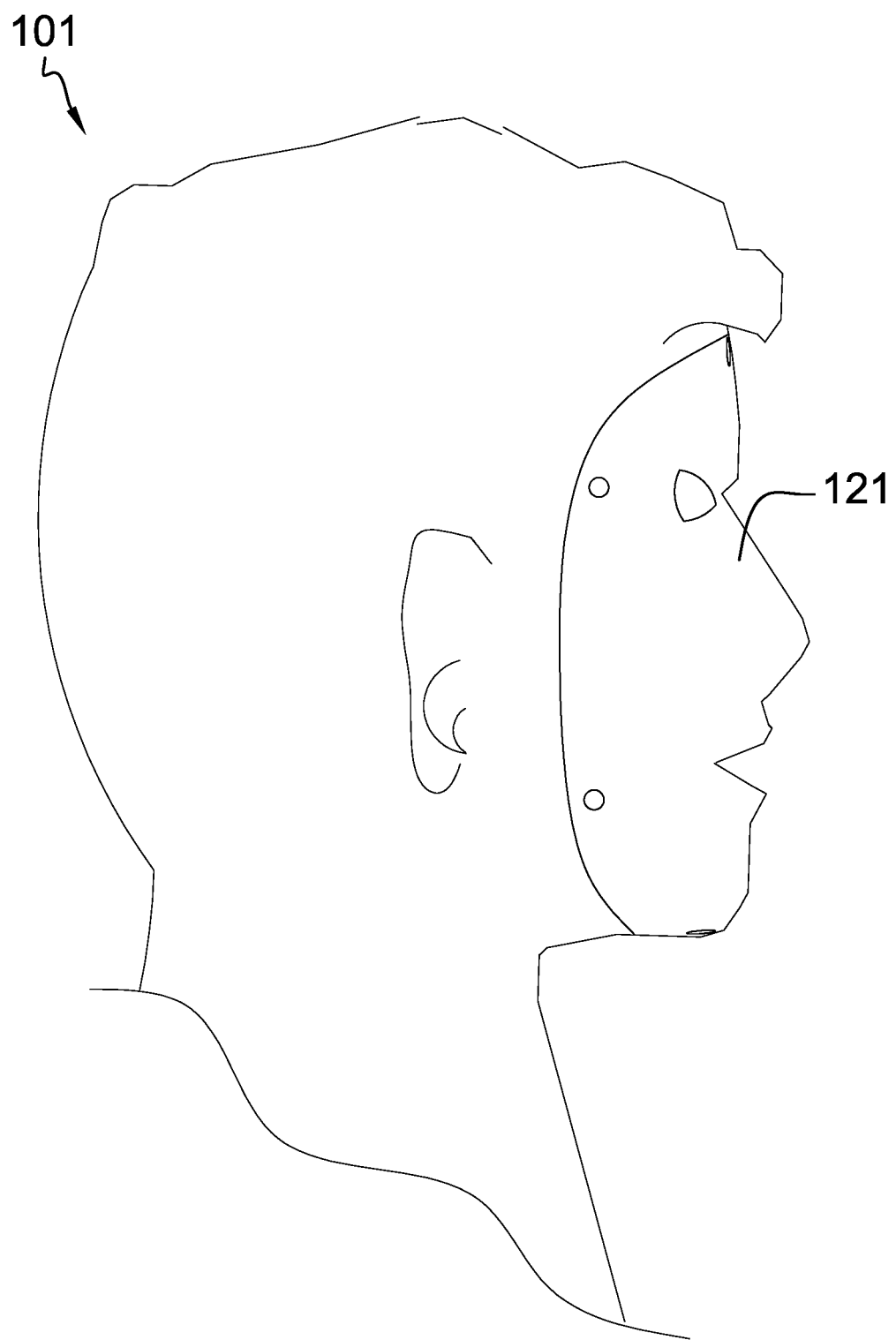
FIG. 5 is an in-use view of an embodiment of the disclosure.
Figure 6:
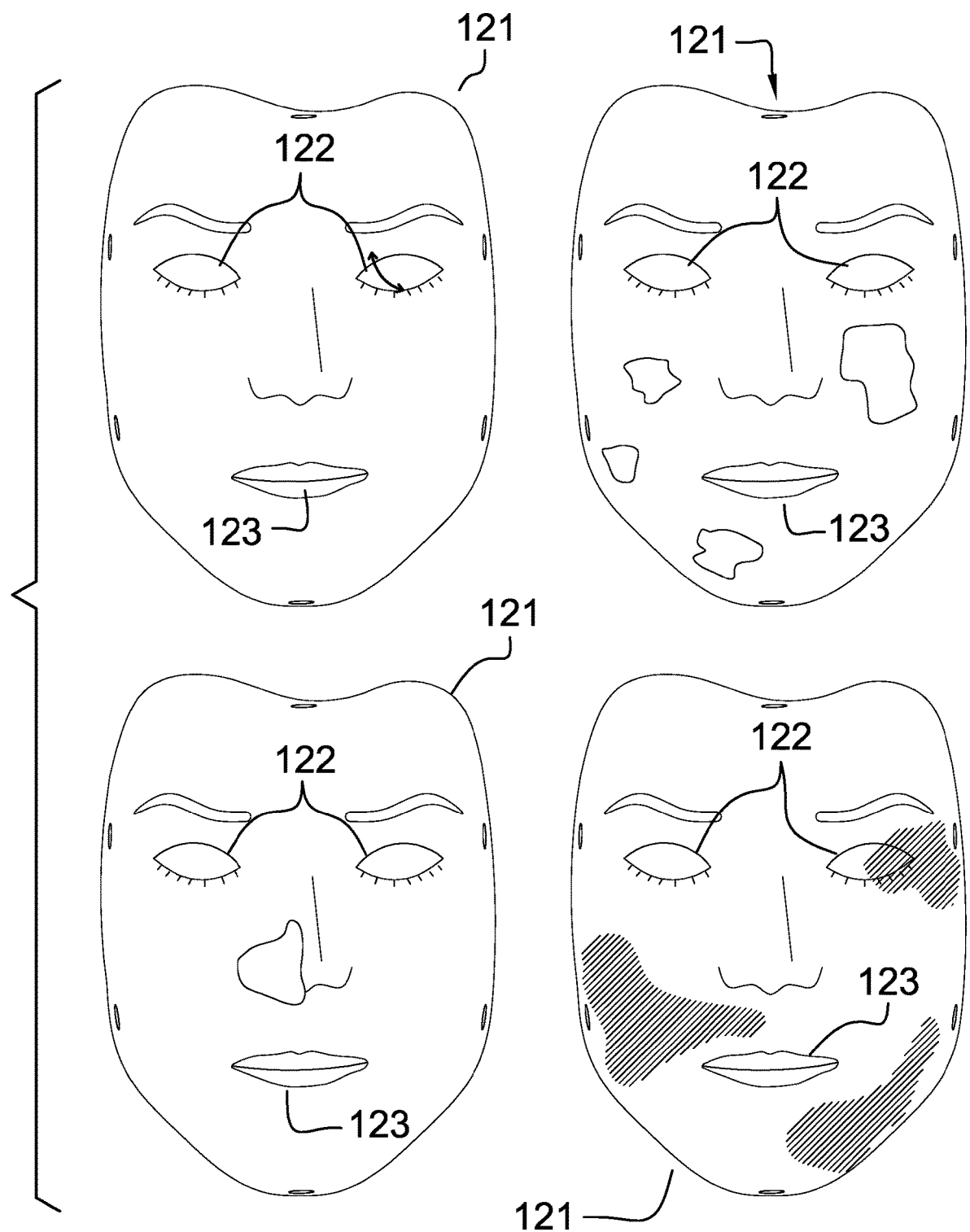
FIG. 6 is a view of an embodiment of the disclosure.

Detailed reference will now be made to one or more potential embodiments of the disclosure, which are illustrated in FIGS. 1 through 6.

The embalming training system 100 (hereinafter invention) is a training device. The invention 100 is adapted for use in mortuary services. The invention 100 trains an individual in the embalming process. The invention 100 comprises a puppet structure 101 and a fluid transport structure 102. The fluid transport structure 102 is contained in the puppet structure 101. The puppet structure 101 is a puppet that simulates a body that is undergoing the embalming process. The fluid transport structure 102 is a fluid network that simulates the arteries and veins of the body that is undergoing the embalming process.

The puppet structure 101 is a puppet. The puppet structure 101 physically simulates the body that is undergoing the embalming process. The puppet structure 101 contains the fluid transport structure 102. The fluid transport structure 102 is positioned within the puppet structure 101 such that the arteries and veins that are simulated by the fluid transport structure 102 are properly positioned within the puppet structure 101. The puppet structure 101 is formed such that the puppet structure 101 appropriately simulates the response of a body that is undergoing the embalming process. The puppet structure 101 comprises a head structure 111, a torso structure 112, a left arm structure 113, a right arm structure 114, a left leg structure 115, and a right leg structure 116.

The head structure 111 is the structure of the puppet structure 101 that simulates the head of the body that is undergoing the embalming process. The torso structure 112 is the structure of the puppet structure 101 that simulates the torso of the body that is undergoing the embalming process.

The left arm structure 113 is the structure of the puppet structure that simulates the left arm of the body that is undergoing the embalming process. The right arm structure 114 is the structure of the puppet structure 101 that simulates the right arm of the body that is undergoing the embalming process. The left leg structure 115 is the structure of the puppet structure 101 that simulates the left leg of the body that is undergoing the embalming process. The right leg structure 116 is the structure of the puppet structure 101 that simulates the right leg of the body that is undergoing the embalming process.

The head structure 111 attaches to the torso structure 112 to form an articulated structure. By articulated is meant that the position of the head structure 111 relative to the torso structure 112 is adjustable. The left arm structure 113 attaches to the torso structure 112 to form an articulated structure. By articulated is meant that the position of the left arm structure 113 relative to the torso structure 112 is adjustable. The right arm structure 114 attaches to the torso structure 112 to form an articulated structure. By articulated is meant that the position of the right arm structure 114 relative to the torso structure 112 is adjustable. The left leg structure 115 attaches to the torso structure 112 to form an articulated structure. By articulated is meant that the position of the left leg structure 115 relative to the torso structure 112 is adjustable. The right leg structure 116 attaches to the torso structure 112 to form an articulated structure. By articulated is meant that the position of the right leg structure 116 relative to the torso structure 112 is adjustable.

The left arm structure 113 further comprises a left proximal arm structure 131 and a left distal arm structure 132.

The left proximal arm structure 131 is the structure of the left arm structure 113 that is proximal to the torso structure 112. The left proximal arm structure 131 simulates the upper left arm of the body that is undergoing the embalming process. The left proximal arm structure 131 is the structure of the left arm structure 113 that attaches to the torso structure 112.

The left distal arm structure 132 is the structure of the left arm structure 113 that is distal from the torso structure 112. The left distal arm structure 132 simulates the lower left arm of the body that is undergoing the embalming process. The left distal arm structure 132 is the structure of the left arm structure 113 that attaches to the left proximal arm structure 131. The left distal arm structure 132 attaches to the left proximal arm structure 131 to form an articulated structure. By articulated is meant that the position of the left distal arm structure 132 relative to the left proximal arm structure 131 is adjustable.

The right arm structure 114 further comprises a right proximal arm structure 141 and a right distal arm structure 142.

The right proximal arm structure 141 is the structure of the right arm structure 114 that is proximal to the torso structure 112. The right proximal arm structure 141 simulates the upper right arm of the body that is undergoing the embalming process. The right proximal arm structure 141 is the structure of the right arm structure 114 that attaches to the torso structure 112.

The right distal arm structure 142 is the structure of the right arm structure 114 that is distal from the torso structure 112. The right distal arm structure 142 simulates the lower right arm of the body that is undergoing the embalming process. The right distal arm structure 142 is the structure of the right arm structure 114 that attaches to the right proximal arm structure 141. The right distal arm structure 142 attaches to the right proximal arm structure 141 to form an articulated structure. By articulated is meant that the position of the right distal arm structure 142 relative to the right proximal arm structure 141 is adjustable.

The left leg structure 115 further comprises a left proximal leg structure 151 and a left distal leg structure 152.

The left proximal leg structure 151 is the structure of the left leg structure 115 that is proximal to the torso structure 112. The left proximal leg structure 151 simulates the upper left leg of the body that is undergoing the embalming process. The left proximal leg structure 151 is the structure of the left leg structure 115 that attaches to the torso structure 112.

The left distal leg structure 152 is the structure of the left leg structure 115 that is distal from the torso structure 112. The left distal leg structure 152 simulates the lower left leg of the body that is undergoing the embalming process. The left distal leg structure 152 is the structure of the left leg structure 115 that attaches to the left proximal leg structure 151. The left distal leg structure 152 attaches to the left proximal leg structure 151 to form an articulated structure. By articulated is meant that the position of the left distal leg structure 152 relative to the left proximal leg structure 151 is adjustable.

The right leg structure 116 further comprises a right proximal leg structure 161 and a right distal leg structure 162.

The right proximal leg structure 161 is the structure of the right leg structure 116 that is proximal to the torso structure 112. The right proximal leg structure 161 simulates the upper right leg of the body that is undergoing the embalming process. The right proximal leg structure 161 is the structure of the right leg structure 116 that attaches to the torso structure 112.

The right distal leg structure 162 is the structure of the right leg structure 116 that is distal from the torso structure 112. The right distal leg structure 162 simulates the lower right leg of the body that is undergoing the embalming process. The right distal leg structure 162 is the structure of the right leg structure 116 that attaches to the right proximal leg structure 161. The right distal leg structure 162 attaches to the right proximal leg structure 161 to form an articulated structure. By articulated is meant that the position of the right distal leg structure 162 relative to the right proximal leg structure 161 is adjustable.

The fluid transport structure 102 is a fluid network that is formed in the puppet structure 101. The fluid transport structure 102 physically simulates the arteries and veins in the body that is undergoing the embalming process. The fluid transport structure 102 receives the embalming fluids into the invention 100. The fluid transport structure 102 comprises an aorta artery structure 171, a gastric vein structure 172, a left carotid artery structure 173, a right carotid artery structure 174, a left jugular vein structure 175, a right jugular vein structure 176, a left brachial artery structure 181, a right brachial artery structure 182, a left basilic vein structure 183, a right basilic vein structure 184, a left iliac artery structure 191, a right iliac artery structure 192, a left iliac vein structure 193, and a right iliac vein structure 194.

The aorta artery structure 171 is the structure of the fluid transport structure 102 that simulates the aortic artery of the body that is undergoing the embalming process. The gastric vein structure 172 is the structure of the fluid transport structure 102 that simulates the gastric vein of the body that is undergoing the embalming process. The left carotid artery structure 173 is the structure of the fluid transport structure 102 that simulates the left carotid artery of the body that is undergoing the embalming process. The right carotid artery structure 174 is the structure of the fluid transport structure 102 that simulates the right carotid artery of the body that is undergoing the embalming process. The left jugular vein structure 175 is the structure of the fluid transport structure 102 that simulates the left jugular vein of the body that is undergoing the embalming process. The right jugular vein structure 176 is the structure of the fluid transport structure 102 that simulates the right jugular vein of the body that is undergoing the embalming process.

The left brachial artery structure 181 is the structure of the fluid transport structure 102 that simulates the left brachial artery of the body that is undergoing the embalming process. The right brachial artery structure 182 is the structure of the fluid transport structure 102 that simulates the right brachial artery of the body that is undergoing the embalming process. The left basilic vein structure 183 is the structure of the fluid transport structure 102 that simulates the left basilic vein of the body that is undergoing the embalming process. The right basilic vein structure 184 is the structure of the fluid transport structure 102 that simulates the right basilic vein of the body that is undergoing the embalming process.

The left iliac artery structure 191 is the structure of the fluid transport structure 102 that simulates the left iliac artery of the body that is undergoing the embalming process. The right iliac artery structure 192 is the structure of the fluid transport structure 102 that simulates the right iliac artery of the body that is undergoing the embalming process. The left iliac vein structure 193 is the structure of the fluid transport structure 102 that simulates the left iliac vein of the body that is undergoing the embalming process. The right iliac vein structure 194 is the structure of the fluid transport structure 102 that simulates the right iliac vein of the body that is undergoing the embalming process.

The aorta artery structure 171 and the gastric vein structure 172 are positioned in the torso structure 112 of the puppet structure 101. The left carotid artery structure 173 and the right carotid artery structure 174 are positioned in the head structure 111 of the puppet structure 101. The left jugular vein structure 175 and the right jugular vein structure 176 are positioned in the head structure 111 of the puppet structure 101.

The left brachial artery structure 181 and the left basilic vein structure 183 are positioned in the left proximal arm structure 131 of the left arm structure 113 of the puppet structure 101. The right brachial artery structure 182 and the right basilic vein structure 184 are positioned in the right proximal arm structure 141 of the right arm structure 114 of the puppet structure 101.

The left iliac artery structure 191 and the left iliac vein structure 193 are positioned in the left proximal leg structure of the left leg structure 115 of the puppet structure 101. The right iliac artery structure 192 and the right iliac vein structure 194 are positioned in the right proximal leg structure 161 of the right leg structure 116 of the puppet structure 101.

In a second potential embodiment of the disclosure, the puppet structure 101 further comprises a mask structure 121. The mask structure 121 further comprises an orbital structure 122 and a mouth structure 123. The mask structure 121 attaches to the head structure 111 of the puppet structure 101. The mask structure 121 is used to train an individual in facial 19 reconstruction.

The mask structure 121 is used to simulate the face of the head structure 111. Specifically, the mask structure 121 simulates the frontal bone, the left zygomatic bone, the right zygomatic bone, the maxilla bone, and the mandible bone a body. The mask structure 121 further simulates the mouth, the left orbital cavity, and the right orbital cavity of the skull.

The mask structure 121 is formed as a rigid polymer structure. The mask structure 121 removably attaches to the head structure. The mask structure 121 is formed to simulate the damage to the skull and face from head injuries of the type that are commonly presented to a mortuary service. A student under training repairs the simulated damages using the tools of mortuary services to reconstruct the face of an individual simulated by the puppet structure 101.

The following definitions were used in this disclosure:

Abdomen: As used in this disclosure, the abdomen refers to the portion of the torso between the bottom of the rib cage and the hips of the person.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anterior: As used in this disclosure, anterior is a term that is used to refer to the front side or direction of a structure. When comparing two objects, the anterior object is the object that is closer to the front of the structure.

Articulated: As used in this disclosure, articulated refers to two objects that are joined together using a hinge or a flexible joint such that the first object moves relative to the second object. A structure that contains an articulated subcomponent is referred to as an articulated structure.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Coronal Plane: As used in this disclosure, the coronal plane refers to a reference plane that bisects an anterior surface and posterior surface. The coronal plane is also referred to as the lateral plane.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Distal and Proximal: As used in this disclosure, the terms distal and proximal refers to a directional sense or location relative to the medial axis of the body. When comparing the location of a first object relative to a second object, when the minimum span of the distance between the first object and the medial axis is greater than the minimum span of the distance between the second object and the medial axis, the first object is said to be the distal object or the object distal from the medial axis. Alternately, when the minimum span of the distance between the first object and the medial axis is lesser than the minimum span of the distance between the second object and the medial axis, the first object is said to be the proximal object or the object proximal to the medial axis.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Eye: As used in this disclosure, the eye is a sensory organ commonly found in animals, including human beings. The eye detects electromagnetic radiation. The eye is found in the head of a human being. The transparent exterior surface of the eye is called the cornea.

Face: As used in this disclosure, the face is the anterior portion of the head formed from the inferior surface of the mandible to the center of the frontal bone of the skull. The eyes, nose, and mouth of a person are located in the face.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Impermeable: As used in this disclosure, the term fluid impermeable refers to: a) the ability of a structure to not allow a fluid to pass through the structure; or, b) the ability of a material not absorb through the exterior surfaces of the material a fluid that the material is immersed in or exposed to.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Fluid Network: As used in this disclosure, a fluid network refers to a transport structure that: a) receives a fluid into the fluid network; b) transports the fluid through a series of pipes, valves, and manifolds; and, c) discharges the fluid from the fluid network.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Head: As used in this disclosure, the head refers to the structures of a body that are associated with a skull.

Hip: As used in this disclosure, the hip refers to the joint that attaches the thigh bone to the pelvis. The also refers to the region of the body surrounding the hip especially in the regions that are lateral relative to the hip.

Head: As used in this disclosure, the head refers to the structures of a body that are associated with a skull. Use skull.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hose: As used in this disclosure, a hose is a flexible hollow prism-shaped device that is used for transporting liquids and gases. When referring to a hose in this disclosure, the terms inner dimension and outer dimension are used as they would be used by those skilled in the plumbing arts.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Lateral: As used in this disclosure, lateral refers to a directional sense or location of the body. Specifically, lateral refers to an object or a side of an object that is proximal to the side or that is distal from the medial axis of the body. The lateral direction movement is always perpendicular to the anterior posterior axis. Lateral movement is often called sideways movement.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed is viewed from posterior side towards the anterior side. The right side of any object is the same side as the right side of the human body when the object is viewed is viewed from posterior side towards the anterior side. The left and right sides of the object remain unchanged by changes to the direction from which the object is viewed.

Lip: As used in this disclosure, the lip refers to an anatomical structure that forms the perimeter of the mouth. The mouth is enclosed by two lips: the superior (or upper) lip and the inferior (or lower) lip. Each lip is formed with a muscle known as the orbicular obis that are used to position and control the position of each lip. Each lip is formed with a vermilion. The vermilion is formed from skin is the red portion of the lip. The vermilion border forms the boundary between the red color of the vermilion and the normal skin tone of an individual. The vermilion border of each lip forms the boundary between the vermilion and the skin of the region of the face called the cutaneous lip. The difference in depth between the skin of the vermilion and the skin of the cutaneous lip give the vermilion border its well-defined and easily identifiable structure. The vermilion border of the superior lip forms a roughly arcuate structure known as Cupid's bow.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Mandible: As used in this disclosure, the mandible is the jaw bone of a human being. The inferior dentition grows out of the mandible.

Mandibular: As used in this disclosure, mandibular means pertaining or related to the mandible.

Mask: As used in this disclosure, a mask is a covering for the face of a person. A mask that filters, routes, and/or concentrates a flow of gas to the nose and mouth of a patient is called a respiratory mask.

Maxilla: As used in this disclosure, is a bone in the skull of a human being. The maxilla is bounded on the lower end by the superior dentition. The maxilla runs from the superior dentition, around the nasal septum to the inferior and medial locations around the orbital structures that contain the eyes. The maxilla is often referred to as the upper jaw bone of a human being.

Maxillary: As used in this disclosure, maxillary means pertaining or related to the maxilla.

Medial: As used in this disclosure, medial refers to a directional sense or location of the body. Specifically, medial refers to a first object or a side of a first object that is closer to the medial axis or more distal from the side of the body relative to a second object or side of a second object.

Medial Axis: As used in this disclosure, the medial axis is the center line of the body as the line is drawn from the head to the foot. When two objects are compared relative to the medial axis, the object closer to the medial axis is referred to as the medial object and the object distal from the medial axis is referred to as the lateral object.

Mouth: As used in this disclosure, a mouth refers to an aperture that is formed in the face. The perimeter of the mouth is surrounded by the lips. The mouth controls access into an internal cavity that is formed in the head. This cavity contains the tongue and teeth. The mouth receives materials (such as foodstuffs and air) from the environment and transports the received materials to the gastrointestinal tract and the lungs. The mouth discharges exhales air. The mouth can manipulate the exhaled air to generate audible communications. Them and other materials discharged from the gastrointestinal tract. The mouth discharges materials that have been rejected by the gastrointestinal tract.

Neck: As used in this disclosure, the neck refers to the portion of a biological entity that attaches the head of the biological entity to the torso of the biological entity.

Negative Space: As used in this disclosure, negative space is a method of defining an object through the use of open or empty space as the definition of the object itself, or, through the use of open or empty space to describe the boundaries of an object.

Nose: As used in this disclosure, the nose is a sensory organ commonly found in animals, including human beings. The nose detects chemicals that are found in the atmosphere. The nose is found in the head of a human being.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Orbital: As used in this disclosure, an orbital is a cavity that is formed in a skull to contain an eye.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Patient: As used in this disclosure, a patient is a person who is designated to receive a medical treatment, therapy, or service. The term patient may be extended to an animal when used within the context of the animal receiving veterinary treatment or services.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Posterior: As used in this disclosure, posterior is a term that is used to refer to the side of an object that is distal or in the opposite direction of the anterior side. When comparing two items, the posterior item is the item that is distal from the anterior of the object.

Primary Shape: As used in this disclosure, the primary shape refers to a description of the rough overall geometric shape of an object that is assembled from multiple components or surfaces. Use Roughly Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Proximal: As used in this disclosure, the term proximal is used to describe the relative location of two objects in relation to a specified reference point. The proximal object is the object that is closer to the specified reference point.

Puppet: As used in this disclosure, a puppet is a three-dimensional figure resembling a human, animal or symbolic image that is used for decorative, entertainment, or educational purposes.

Reservoir: As used in this disclosure, a reservoir refers to a container or containment system that is configured to store a fluid.

Sagittal Plane: As used in this disclosure, the sagittal plane refers to a plane that is perpendicular to the both the coronal (or lateral) plane and the transverse plane.

Skull: As used in this disclosure, the skull refers to a bone structure that encloses the brain of a human body. The skull comprises six primary cranial bones and a plurality of other bones. The six primary cranial bones comprise: the frontal bone, the maxilla bone, the left zygomatic bone, the right zygomatic bone, the left parietal bone, the right parietal bone, the left temporal bone, the right temporal bone, and the occipital bone. The frontal bone forms the superior anterior enclosure of the approximately anterior portions of the brain. The maxilla bone is centered over the mouth below the frontal bone. The left zygomatic bone is a first bone that joins the frontal bone to the maxilla bone. The right zygomatic bone is a second bone that joins the frontal bone to the maxilla bone. The left parietal bone encloses the left posterior region from the superior side. The right parietal bone encloses the right posterior region from the superior side. The left temporal bone encloses the left posterior region from the inferior side. The right temporal bone encloses the right posterior region from the inferior side. The occipital bone encloses the posterior region of the brain from the inferior side. The left temple is the location of the skull where the frontal bone, the left parietal bone, and the left temporal bone are joined. The right temple is the location of the skull where the frontal bone, the right parietal bone, and the right temporal bone are joined. The left orbital is as a cavity that is bounded by the frontal bone, the maxilla, and the left zygomatic bone. The right orbital is as a cavity that is bounded by the frontal bone, the maxilla, and the right zygomatic bone.

Solid: As used in this disclosure, a solid refers to a state (phase) of matter that: 1) has a fixed volume; and, 2) does not flow.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Torso: As used in this disclosure, the torso refers to the portion of a human body between the neck and the pelvis. The spine is primarily contained within the torso.

Transverse Plane: As used in this disclosure, a transverse plane is a plane that divides an object into a superior section and an inferior section. In a person the transverse plane would be perpendicular to the medial axis of a body. See Superior Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Waist: As used in this disclosure, the waist refers to the perimeter around the abdomen of a person. Traditionally, the perimeter formed by the waist is closer to the hips than the ribs of the person.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An embalming training device comprising; and
a puppet structure and a fluid transport structure;
wherein the puppet structure contains the fluid transport structure;
wherein the embalming training device is adapted for use in mortuary services;
wherein the embalming training device is adapted to train an individual in the embalming process;
wherein the puppet structure is a puppet that physically simulates a body that is undergoing the embalming process;
wherein the fluid transport structure is a fluid network that physically simulates arteries and veins of the body that are undergoing the embalming process; and
wherein the fluid transport structure receives embalming fluids into the embalming training device.

2. The embalming training device according to claim 1
wherein the fluid transport structure is positioned within the puppet structure such that the arteries and veins that are simulated by the fluid transport structure are properly positioned within the puppet structure;
wherein the puppet structure is formed such that the puppet structure appropriately simulates the response of the body that is undergoing the embalming process.

3. The embalming training device according to claim 2
wherein the puppet structure comprises a head structure, a torso structure, a left arm structure, a right arm structure, a left leg structure, and a right leg structure;
wherein the head structure is the structure of the puppet structure that simulates the head of the body that is undergoing the embalming process;
wherein the torso structure is the structure of the puppet structure that simulates the torso of the body that is undergoing the embalming process;
wherein the left arm structure is the structure of the puppet structure that simulates the left arm of the body that is undergoing the embalming process;
wherein the right arm structure is the structure of the puppet structure that simulates the right arm of the body that is undergoing the embalming process;
wherein the left leg structure is the structure of the puppet structure that simulates the left leg of the body that is undergoing the embalming process;
wherein the right leg structure is the structure of the puppet structure that simulates the right leg of the body that is undergoing the embalming process.

4. The embalming training device according to claim 3
wherein the fluid transport structure comprises an aorta artery structure, a gastric vein structure, a left carotid artery structure, a right carotid artery structure, a left jugular vein structure, a right jugular vein structure, a left brachial artery structure, a right brachial artery structure, a left basilic vein structure, a right basilic vein structure, a left iliac artery structure, a right iliac artery structure, a left iliac vein structure, and a right iliac vein structure;
wherein the aorta artery structure is the structure of the fluid transport structure that simulates the aortic artery of the body that is undergoing the embalming process;
wherein the gastric vein structure is the structure of the fluid transport structure that simulates the gastric vein of the body that is undergoing the embalming process;
wherein the left carotid artery structure is the structure of the fluid transport structure that simulates the left carotid artery of the body that is undergoing the embalming process;
wherein the right carotid artery structure is the structure of the fluid transport structure that simulates the right carotid artery of the body that is undergoing the embalming process;
wherein the left jugular vein structure is the structure of the fluid transport structure that simulates the left jugular vein of the body that is undergoing the embalming process;
wherein the right jugular vein structure is the structure of the fluid transport structure that simulates the right jugular vein of the body that is undergoing the embalming process;
wherein the left brachial artery structure is the structure of the fluid transport structure that simulates the left brachial artery of the body that is undergoing the embalming process;
wherein the right brachial artery structure is the structure of the fluid transport structure that simulates the right brachial artery of the body that is undergoing the embalming process;
wherein the left basilic vein structure is the structure of the fluid transport structure that simulates the left basilic vein of the body that is undergoing the embalming process;
wherein the right basilic vein structure is the structure of the fluid transport structure that simulates the right basilic vein of the body that is undergoing the embalming process;
wherein the left iliac artery structure is the structure of the fluid transport structure that simulates the left iliac artery of the body that is undergoing the embalming process;
wherein the right iliac artery structure is the structure of the fluid transport structure that simulates the right iliac artery of the body that is undergoing the embalming process;
wherein the left iliac vein structure is the structure of the fluid transport structure that simulates the left iliac vein of the body that is undergoing the embalming process;
wherein the right iliac vein structure is the structure of the fluid transport structure that simulates the right iliac vein of the body that is undergoing the embalming process.

5. The embalming training device according to claim 4
wherein the head structure attaches to the torso structure to form an articulated structure;
wherein the left arm structure attaches to the torso structure to form an articulated structure;
wherein the right arm structure attaches to the torso structure to form an articulated structure;
wherein the left leg structure attaches to the torso structure to form an articulated structure;

wherein the right leg structure attaches to the torso structure to form an articulated structure.

6. The embalming training device according to claim 5 wherein the left arm structure further comprises a left proximal arm structure and a left distal arm structure;
wherein the left proximal arm structure is the structure of the left arm structure that is proximal to the torso structure;
wherein the left proximal arm structure simulates the upper left arm of the body that is undergoing the embalming process;
wherein the left proximal arm structure is the structure of the left arm structure that attaches to the torso structure;
wherein the left distal arm structure is the structure of the left arm structure that is distal from the torso structure;
wherein the left distal arm structure simulates the lower left arm of the body that is undergoing the embalming process;
wherein the left distal arm structure is the structure of the left arm structure that attaches to the left proximal arm structure;
wherein the left distal arm structure attaches to the left proximal arm structure to form an articulated structure.

7. The embalming training device according to claim 6 wherein the right arm structure further comprises a right proximal arm structure and a right distal arm structure;
wherein the right proximal arm structure is the structure of the right arm structure that is proximal to the torso structure;
wherein the right proximal arm structure simulates the upper right arm of the body that is undergoing the embalming process;
wherein the right proximal arm structure is the structure of the right arm structure that attaches to the torso structure;
wherein the right distal arm structure is the structure of the right arm structure that is distal from the torso structure;
wherein the right distal arm structure simulates the lower right arm of the body that is undergoing the embalming process;
wherein the right distal arm structure is the structure of the right arm structure that attaches to the right proximal arm structure;
wherein the right distal arm structure attaches to the right proximal arm structure to form an articulated structure.

8. The embalming training device according to claim 7 wherein the left leg structure further comprises a left proximal leg structure and a left distal leg structure;
wherein the left proximal leg structure is the structure of the left leg structure that is proximal to the torso structure;
wherein the left proximal leg structure simulates the upper left leg of the body that is undergoing the embalming process;
wherein the left proximal leg structure is the structure of the left leg structure that attaches to the torso structure;
wherein the left distal leg structure is the structure of the left leg structure that is distal from the torso structure;
wherein the left distal leg structure simulates the lower left leg of the body that is undergoing the embalming process;
wherein the left distal leg structure is the structure of the left leg structure that attaches to the left proximal leg structure;
wherein the left distal leg structure attaches to the left proximal leg structure to form an articulated structure.

9. The embalming training device according to claim 8 wherein the right leg structure further comprises a right proximal leg structure and a right distal leg structure;
wherein the right proximal leg structure is the structure of the right leg structure that is proximal to the torso structure;
wherein the right proximal leg structure simulates the upper right leg of the body that is undergoing the embalming process;
wherein the right proximal leg structure is the structure of the right leg structure that attaches to the torso structure;
wherein the right distal leg structure is the structure of the right leg structure that is distal from the torso structure;
wherein the right distal leg structure simulates the lower right leg of the body that is undergoing the embalming process;
wherein the right distal leg structure is the structure of the right leg structure that attaches to the right proximal leg structure;
wherein the right distal leg structure attaches to the right proximal leg structure to form an articulated structure.

10. The embalming training device according to claim 9 wherein the aorta artery structure and the gastric vein structure are positioned in the torso structure of the puppet structure;
wherein the left carotid artery structure and the right carotid artery structure are positioned in the head structure of the puppet structure;
wherein the left jugular vein structure and the right jugular vein structure are positioned in the head structure of the puppet structure;
wherein the left brachial artery structure and the left basilic vein structure are positioned in the left proximal arm structure of the left arm structure of the puppet structure;
wherein the right brachial artery structure and the right basilic vein structure are positioned in the right proximal arm structure of the right arm structure of the puppet structure;
wherein the left iliac artery structure and the left iliac vein structure are positioned in the left proximal leg structure of the left leg structure of the puppet structure;
wherein the right iliac artery structure and the right iliac vein structure are positioned in the right proximal leg structure of the right leg structure of the puppet structure.

11. The embalming training device according to claim 10 wherein the puppet structure further comprises a mask structure;
wherein the mask structure further comprises an orbital structure and a mouth structure;
wherein the mask structure attaches to the head structure of the puppet structure;
wherein the mask structure simulates a face of the head structure;
wherein the mask structure simulates the frontal bone, the left zygomatic bone, the right zygomatic bone, the maxilla bone, and the mandible bone the face;
wherein the mask structure further simulates the mouth, the left orbital cavity, and the right orbital cavity of the skull;
wherein the mask structure removably attaches to the head structure;

wherein the mask structure is formed to simulate the damage to a skull and the face from head injuries.

* * * * *